United States Patent

Andrews

[15] 3,670,989
[45] June 20, 1972

[54] CARTRIDGE LOADING MOTION PICTURE PROJECTION APPARATUS

[72] Inventor: Peter Andrews, Penfield, N.Y.
[73] Assignee: Eastman Kodak Company, Rochester, N.Y.
[22] Filed: March 18, 1970
[21] Appl. No.: 20,507

[52] U.S. Cl. ............................................242/192, 242/197
[51] Int. Cl. ...............G03b 23/02, G11b 15/32, B65h 12/14
[58] Field of Search..................242/192, 195, 186, 188, 197, 242/198, 201, 202, 206, 207, 208, 209, 210, 71.1; 352/157, 158, 725, 78; 226/91, 92

[56] References Cited

UNITED STATES PATENTS

| | | | |
|---|---|---|---|
| 3,542,310 | 11/1970 | Vockenhuber et al. | 242/192 |
| 3,550,880 | 12/1970 | Palmer | 242/192 |
| 3,550,881 | 12/1970 | Roman | 242/192 |

*Primary Examiner*—George F. Mautz
*Attorney*—Robert W. Hampton and G. Herman Childress

[57] ABSTRACT

A cartridge for a cartridge-loading motion picture projector has an opening or slot therein for receiving portions of a film feeding mechanism that is used for extracting film from a film roll within the cartridge and for feeding the film to automatic or self threading devices of the motion picture projector. The cartridge has a deflectable member, such as a spring or tongue, positioned with respect to said opening so that entrance of the film feeding mechanism into the cartridge deflects such member from its normal position to a film guiding position within the cartridge. The deflectable member is located in the cartridge so that during rotation of the film roll in an unwinding direction by the film feeding mechanism the leading end of the film engages the member and is guided by it to a tip end of a film engages the member and is guided by it to a tip end of a film stripping finger. The finger then lifts the leading end of the film from the roll and delivers it through a guide slot or channel to automatic threading devices of the projector. The apparatus of this invention also comprises improved film feeding mechanisms that are useful with the cartridge disclosed herein as well as with other cartridges. Such film feeding mechanisms comprise means for deflecting the deflectable member as the mechanism enters the film cartridge, and means for narrowing the normal slot or channel between a film drive belt and the film stripping member, thereby to improve film feeding operations of the mechanism and to deliver film from the device properly oriented for reception by an automatic threading device of the projector.

12 Claims, 6 Drawing Figures

PETER ANDREWS
INVENTOR.

BY
D. Herman Childress
Robert W. Hampton
ATTORNEYS

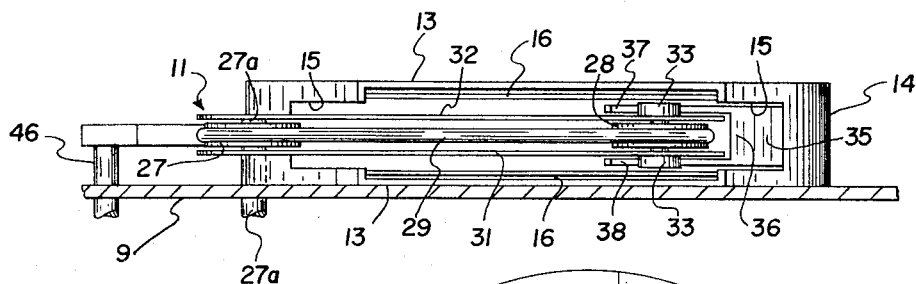
FIG. 3
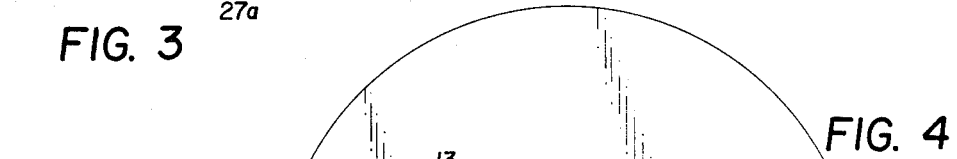
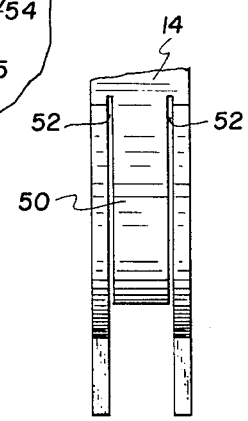
FIG. 4
FIG. 5
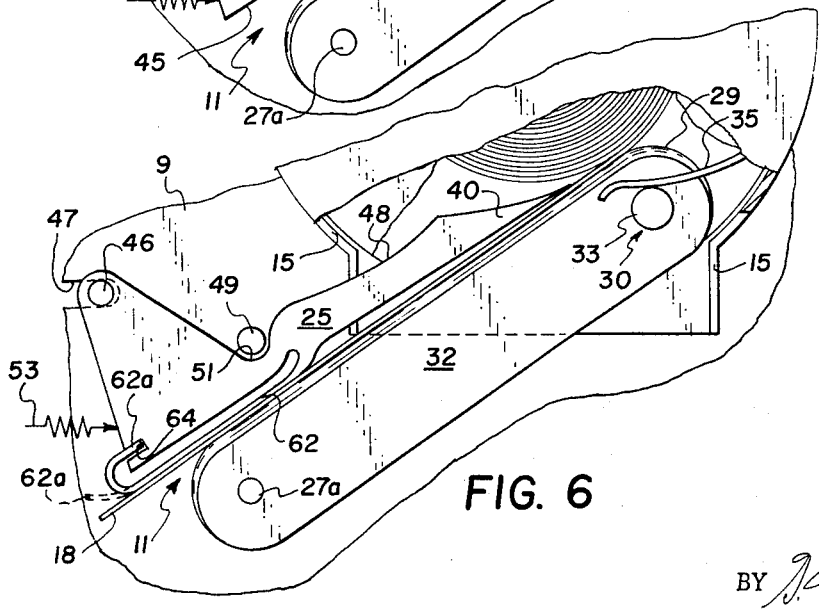
FIG. 6
PETER ANDREWS
INVENTOR.
BY J. Herman Childers
Robert W. Hampton
ATTORNEYS

CARTRIDGE LOADING MOTION PICTURE PROJECTION APPARATUS

CROSS-REFERENCES TO RELATED APPLICATIONS

Reference is made to commonly assigned copending U.S. patent application Ser. No. 643,503, entitled CARTRIDGE FOR REEL OF STRIP MATERIAL, filed on June 5, 1967 in the name of John J. Bundschuh et al., now U.S. Pat. No. 3,536,276; Ser. No. 685,616, entitled CINEMATOGRAPHIC PROJECTORS OR THE LIKE AND CARTRIDGES FOR USE THEREWITH, filed on Nov. 24, 1967 in the name of John J. Bundschuh, now U.S. Pat. No. 3,522,683; Ser. No. 731,377, entitled FILM STRIPPING MECHANISM, filed on May 23, 1968 in the name of Allan M. Palmer, now U.S. Pat. No. 3,550,880; Ser. No. 731,561, entitled CARTRIDGE, filed on May 23, 1968 in the name of John J. Bundschuh, now U.S. Pat. No. 3,554,462; and Ser. No. 731,562, entitled CARTRIDGE, filed on May 23, 1968 in the name of John J. Bundschuh, now U.S. Pat. No. 3,547,373.

BACKGROUND OF THE INVENTION

1. Field of the Invention

The present invention relates to cartridge loading motion picture projection apparatus. More specifically, the invention relates to improved constructions for cartridges for motion picture projectors, and to improved film feeding mechanisms for extracting film from such cartridges and for delivering such film to automatic threading devices of the motion picture projector.

2. Description of the Prior Art

The beforementioned U.S. Pat. No. 3,544,462 and No. 3,547,373 disclose cartridges for motion picture projectors that are adapted to receive a roll of film or the like wound on a film reel. Film is removed from such cartridges and delivered to self threading devices of a projector by film feeding mechanisms, such as disclosed in the commonly assigned U.S. Pat. No. 3,429,518 issued to E. S. McKee on Feb. 25, 1969. One embodiment of such mechanism disclosed in the McKee patent comprises and endless film feeding belt trained about two pulleys and a film stripping finger, both of which are adapted to enter the cartridge through an opening or slot in the lower end thereof for engaging the film roll within the cartridge. The belt is driven in a direction for rotating the film roll within the cartridge in an unwinding direction, thereby to bring the leading end of the film roll into engagement with the film stripping finger which deflects the leading end of the film from the roll and directs it through a film path formed by a portion of the finger and one reach of the belt. Because of the tendency of motion picture film to clockspring (i.e., to become loose on the film roll and expand radially outwardly to form a very loose film roll) and because the film roll in the cartridge may be substantially smaller than the maximum capacity of the cartridge, it is possible for the film feeding device disclosed in the McKee patent to enter into the cartridge by a distance that permits the leading end of the firm to pass between the drive belt and the outer circumference of the chamber within the cartridge that houses the film. This could result in film not being fed to the stripping finger. This problem can be avoided by mounting the drive belt about at least three pulleys arranged substantially at the apices of a triangle so that the belt travels in a generally triangular path, such being disclosed in the beforementioned U.S. Pat. No. 3,536,276, No. 3,552,683 and No. 3,550,880. While this solution has proved quite satisfactory, it does increase the cost of the film feeding mechanism due to the extra pulley and other associated structures. The present invention provides an alternative solution to this problem by an improvement in the film cartridge itself. The invention also relates to improvements in film feeding mechanisms that adapt them for use with such cartridges, and also increases the driving force of the mechanism on the film and properly orients the film for delivery to the automatic threading devices of the projector. A member deflectable into a cartridge by a film feeding mechanism is disclosed in Austrian Pat. No. 272,838. However, the deflectable member disclosed in that patent is not positioned so that it guides film from the outer periphery wall of the cartridge to the film feeding mechanism during rotation of the roll in an unwinding direction but, instead, guides the film away from the drive means of the film feeding mechanism and outwardly toward such peripheral wall so that it can be directed into a slot in the cartridge by a separate and remotely positioned finger or the like.

SUMMARY OF THE INVENTION

Among the several objects of the invention may be noted the provision of a cartridge for a roll of film or the like wherein the film is guided away from a wall of the cartridge to a film feeding mechanism. Another object of the invention is to provide a cartridge and film feeding mechanism that cooperate to eliminate the need for certain special constructions of film feeding mechanisms (such as discussed hereinbefore) without eliminating the result achieved by those mechanisms. Another object of the invention is to provide improved film feeding mechanisms suitable for use with cartridges of this invention and with other cartridges. A further object of the invention is to provide an improved film feeding mechanism which assures a positive driving connection between the film and drive means of such mechanism, and to an improved film feeding mechanism that delivers film from the mechanism in a properly oriented condition.

In accordance with a preferred embodiment of the present invention, a film cartridge comprises a deflectable member positioned adjacent an opening in the cartridge for receiving a film feeding mechanism so that such member is deflected into the cartridge when engaged by the film feeding mechanism as it enters the cartridge. The deflectable member then provides a guide for directing the leading end of the film from the outer periphery of the cartridge toward the film roll for delivery to a stripping finger of the film feeding mechanism.

The present invention also relates to an improved film feeding mechanism having a portion thereof adapted to engage a deflectable portion of the film cartridge for deflecting such portion into the cartridge. A film feeding mechanism according to this invention has means for narrowing the usual slot between a film stripping member and a drive member thereby to increase the force exerted by such members on the film passing therebetween to increase the efficiency of the drive and further to properly orient film strip so that it is easily acceptable by automatic threading devices of the projector.

BRIEF DESCRIPTION OF THE DRAWINGS

In the detailed description of the preferred embodiment of the invention presented below, reference is made to the accompanying drawing, in which:

FIG. 3 is a fragmentary bottom view of the apparatus as indicated by line 3—3 in FIG. 2;

FIG. 4 is a view similar to FIG. 2 but illustrating embodiments of the cartridge and the film feeding mechanism of the invention;

FIG. 5 is a fragmentary side elevation taken from the right side of FIG. 4; and

FIG. 6 is a view illustrating another embodiment of a film feeding mechanism of this invention.

DESCRIPTION OF THE PREFERRED EMBODIMENT

Figure 1:
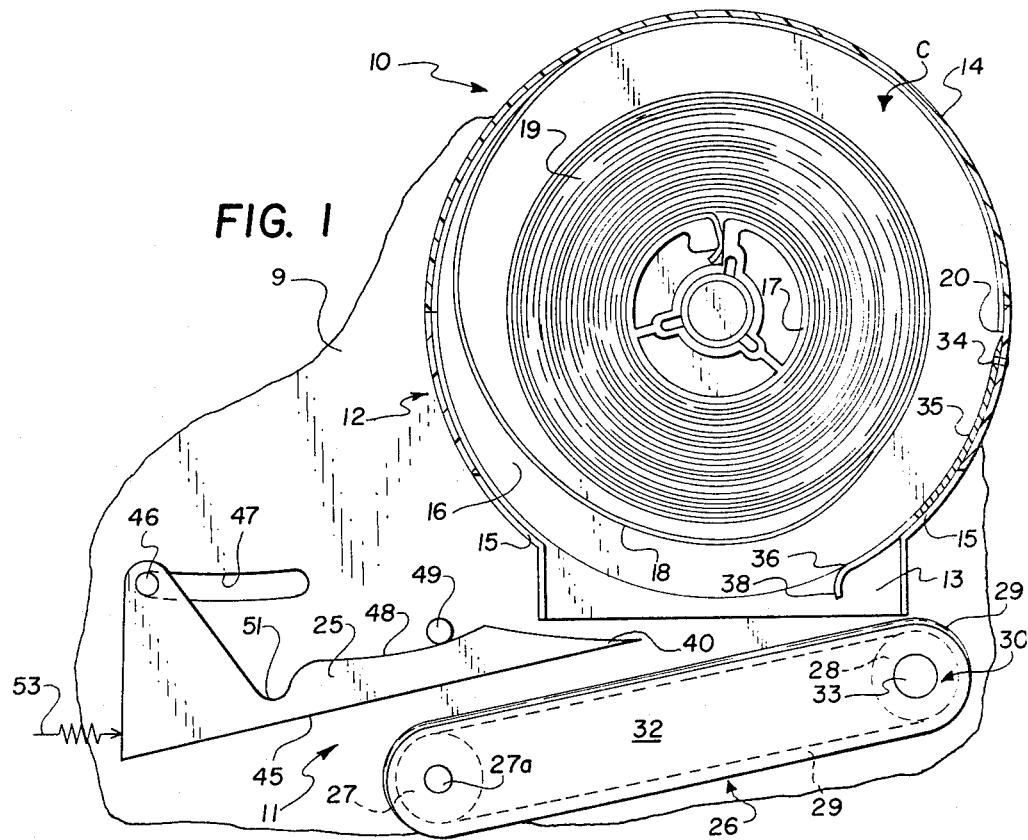
FIGS. 1 and 2 are fragmentary elevation views of a motion picture projector illustrating apparatus of the present invention with portions of the film cartridge of the invention being broken away to illustrate more clearly the internal portions of the cartridge, and showing a film feeding mechanism in accordance with this invention positioned in its retracted position outside the cartridge (FIG. 1) and in a position within the cartridge in engagement with the film roll for feeding film from the roll (FIG. 2)

Because motion picture projection apparatus is well known, the present description will be directed in particular to elements forming part of, or cooperating more directly with, apparatus in accordance with the present invention. It is to be understood that elements not specifically shown or described may take various forms well known to those skilled in the art.

Referring now to the drawings, a film cartridge 10 of the present invention is shown supported on a plate 9 of a motion picture projector. The film cartridge comprises a generally circular housing 12 which includes a pair of spaced, substantially parallel side walls 13, one of which has been broken away in FIGS. 1 and 2 to expose the interior of the cartridge. An edge wall or portion 14 of the cartridge extends between the side walls along the perimeters thereof to define a substantially closed chamber designated C. An opening 15 (best shown in FIG. 3) in the edge wall 14 permits entry of a film feeding mechanism 11. Reference is made to U.S. Pat. Nos. 3,554,462 and 3,547,373 for a more detailed description of cartridge features not disclosed in detail herein.

Rotatably supported within chamber C is a duo-flanged film reel 16 having a core portion 17. One flange of the reel has been broken away in FIGS. 1 and 2 to show a film strip 18 wound about reel core portion 17 to form a film rool 19. The film strip 18 is depicted in a clock-sprung condition wherein the leading end 20 of the strip bears against the inner wall of the cartridge wall 14.

The film feeding mechanism 11 comprises a film stripping finger 25 and a film drive means 26. The latter comprises two pulleys and generally is similar to the drive means disclosed in the aforementioned patent to McKee. Drive means 26 includes a pulley 27 that is driven from shaft 27a, an idler pulley 28 and an endless film feeding or drive belt 29 which is trained about the two pulleys and driven in the direction indicated by the arrow. Pulley 27 can be driven by suitable projector means, such as disclosed in the patent to McKee. Idler pulley 28 is rotatably mounted on a shaft 30 which is supported by and extends between the side walls 31, 32 (FIG. 3) of the film drive means. Preferably, both of the free ends of shaft 30 extend laterally outwardly beyond the side walls 31, 32 to define a pair of bosses 33.

A film guide member is provided on the cartridge for guiding clock-sprung film back toward film roll 19 and stripping member 11. In the illustrated embodiment the film guide member comprises a tongue or leaf spring 35 attached by a rivet 34 to the inside wall of cartridge side wall 14. Spring 35 has a free end portion 36 of which extends toward opening 15 in the cartridge. Spring end portion 36 is engageable by drive means 26 as it enters the cartridge. The free end 36 of leaf spring 35 is preferably bifurcated as shown in FIG. 3 to form fingers or prongs 37, 38. Idler pulley 28 passes between prongs 37, 38 as it enters the film cartridge, and the projecting bosses 33 of shaft 30 engage the prongs for deflecting the spring. The end portions of prongs 37, 38 are preferably curved as shown so that they tend to grip bosses 33 as they are flexed into the cartridge during film feeding operations.

Figure 2:
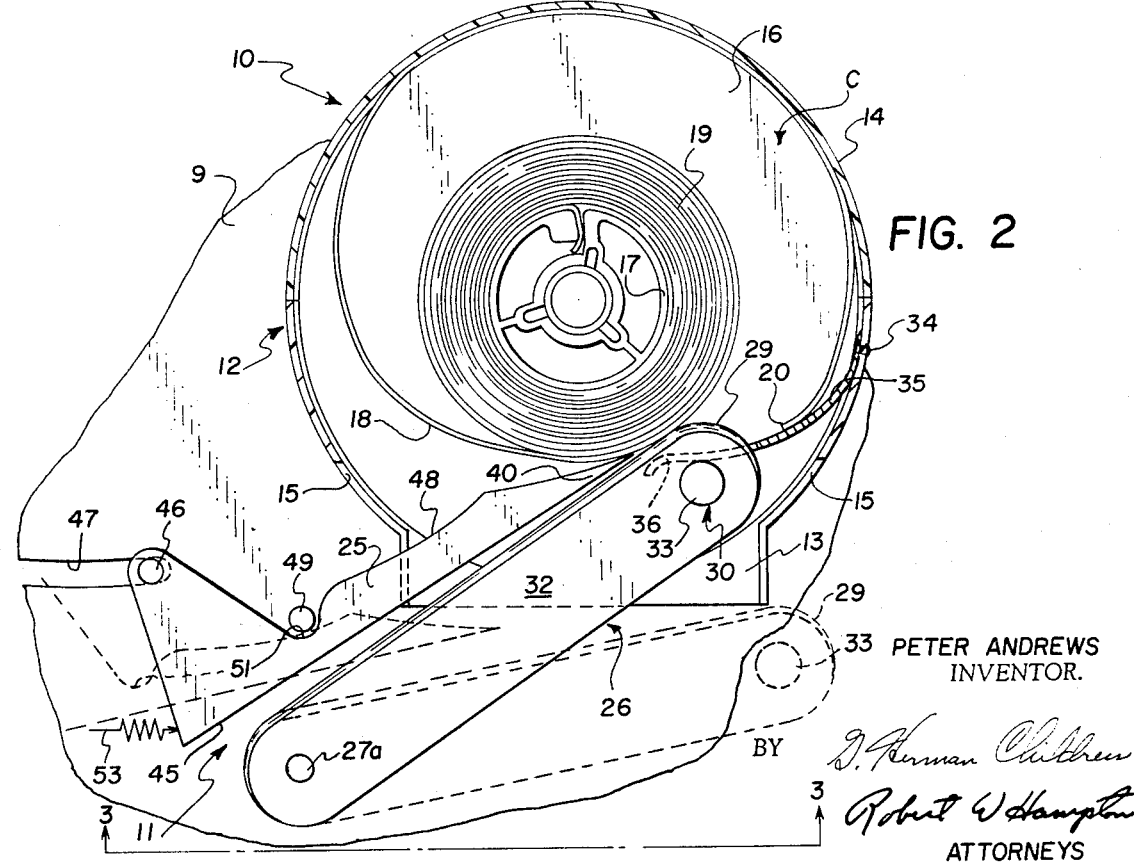

When film is to be removed from the cartridge, first the stripping finger 25 and then the drive means 26 are moved from their respective retracted positions (FIG. 1 and in phantom lines in FIG. 2) to their respective engaged positions (FIG. 2). The drive means 26 pivots about shaft 27a and finger 25 moves about a pivot or shaft 46 that also slides along a guide slot 47 in plate 9, in a manner similar to that described in the beforementioned U.S. Pat. No. 3,522,683. Movement of finger 25 is controlled by a cam surface 48 on the finger that rides along a cam member 49 on plate 9 so that the finger first moves to the right as viewed in FIG. 1 and then swings upwardly into the cartridge only when a notch 51 on the finger is aligned with the cam member 49. The bottom of the notch and the cam member also determines the maximum movement of the finger into the cartridge. The stripping member is spring biased in a counterclockwise direction by spring means diagrammatically shown at 53 so that its movement is limited by engagement of the end 40 of the finger with the outer periphery of the roll unless, of course, the roll is so small that the bottom of notch 51 engages cam member 49. The stripping mechanism can operate with rolls of widely varying diameters, such as illustrated in FIGS. 1 and 2.

When the stripping mechanism is moved into its FIG. 2 position, tip 40 of finger 25 and a portion of belt 29 adjacent to or riding over idler pulley 28 bears against the periphery of the film roll. As the film feeding mechanism moves into the cartridge, part of idler pulley 28 passes between the prongs 37, 38 of spring 35, and bosses 33 engage the prongs and deflect the spring inwardly away from its FIG. 1 position and toward its FIG. 2 position. The extent of deflection of the leaf spring depends, of course, on the distance the film feeding mechanism travels before engaging the film roll. The film roll is rotated in an unwinding direction by the drive belt 29 to drive the leading end 20 of film strip 18 around the inner wall of the cartridge wall 14 and then along the inner surface of leaf spring 35 to the belt 29. When the leading end of the film strip engages belt 29, it is deflected radially inwardly toward the nip defined by belt 29 and the film roll periphery. Continued rotation of the film roll in an unwinding direction by the belt causes the leading end 20 of the film to pass through the nip and into engagement with the tip end 40 of the stripping finger. The latter deflects the film strip away from the film roll periphery along a film path defined by a substantially straight edge 45 of the stripping finger and the adjacent reach of belt 29, i.e., the belt portion extending between the pulleys 27 and 28 and nearest to edge 45.

FIGS. 4 and 5 illustrates an embodiment of a cartridge of this invention wherein prongs 37 and 38 are eliminated. As shown in FIG. 4, a thin deflectable member 50 for guiding the film strip to the film feeding mechanism comprises the tongue like member that preferably is integrally formed with edge wall 14 of the cartridge and may be separated from other portions of the edge wall or from the side walls 13 by elongate slots 52, FIG. 5. The lower or free end of the tongue is solid rather than slotted as previously described in connection with FIGS. 1–3. Member 50 is deflectable into the cartridge by engagement of member 50 either by the belt 29 or (as illustrated) by extensions or bosses 54 of side plates 31 and 32 of the film feeding mechanism. The extensions extend beyond the periphery of idler roller 28 and the belt 29 trained there around so that such extensions are engageable with the tongue 50 of the cartridge, thereby permitting deflection of such tongue without encountering frictional engagement between the tongue and the drive belt that might result in wear in the drive belt. The plate extensions also help guide the film into the nip between the belt 29 and film roll 19. The cartridge construction shown in FIGS. 4 and 5 permits the film feeding mechanism to be essentially the same as illustrated in the beforementioned McKee patent and eliminates the need to provide one or both of the bosses 33 of the shaft 30. This construction also facilitates manufacture of the cartridge because the deflectable member can be formed integrally with the cartridge, thereby eliminating the need for attaching a separate spring member of the like as previously described. In other respects the cartridge shown in FIGS. 4 and 5 can be the same as the cartridge previously described and, accordingly, the same reference numerals have been used to indicate the same or similar parts.

FIG. 6 illustrates a modification of the film feeding mechanism 11 of this invention wherein a flexible finger-like resilient pressure member or flap 62 extends from stripping finger 25 at the end portion thereof opposite from the tip 40. The pressure member is located on the side edge 45 of the stripping finger that is adjacent to the drive belt 29 and may be integrally formed from the finger, if desired. The pressure member is engageable with the film as it passes between the stripping finger and the drive belt to resiliently urge the film firmly into contact with the drive belt adjacent the end of the stripping mechanism nearest to the self threading device of the motion picture projector, thereby effecting a very positive drive of the film in that area. In addition, this structure properly orients the film in the film channel or path between the film stripping member and the belt by preventing cocking or twisting of the film in the film path. Such is desirable since film delivered from the film feeding mechanism in a twisted condition may not be accepted by the automatic threading device of the projector, thereby resulting in failure of the total film threading operation even though the film feeding mechanism operates successfully for extracting film from the cartridge. The free end 62a of the member 62 may be inserted into a slot or opening 64 at the end of the stripping finger, thereby to provide good control of the force exerted by such member against the film. However, if desired, the end of the member 62 may be loose or free (as illustrated in dotted lines in FIG. 5) in which case it can serve to guide the film toward an automatic threading device of the projector.

The invention has been described in detail with particular reference to a preferred embodiment thereof, but it will be understood that variations and modifications can be effected within the spirit and scope of the invention.

I claim:

1. In a film cartridge for a cartridge-loading motion picture projector, the cartridge having a pair of spaced side walls and a peripheral wall extending therebetween to define jointly a substantially closed chamber for a film roll, and means defining an opening in a cartridge wall through which at least a portion of a projector film feeding mechanism can enter the chamber and engage the film roll for driving the film roll in an unwinding direction, the improvement comprising:
   means (1) on the cartridge adjacent to the opening and (2) deflectable from a first position to a second position by the projector film feeding mechanism as the latter enters the film cartridge to engage the film roll for guiding, when in its second position, the leading end of the film roll from the peripheral wall of the cartridge toward the point at which the film feeding mechanism engages the film roll as the roll is rotated in an unwinding direction.

2. The improvement as set forth in claim 1 wherein said deflectable means comprises:
   an elongate flexible member having first and second end portions, said first end portion being secured to the peripheral wall of the cartridge; and
   two spaced prongs on said second portion engageable by portions of the projector film feeding mechanism as said film feeding mechanism moves through the opening in the cartridge toward the film roll periphery.

3. The improvement as set forth in claim 1 wherein said deflectable means comprises a leaf spring secured at one end portion to the peripheral wall of the cartridge.

4. The improvement as set forth in claim 1 wherein said deflectable means comprises a thin, flexible integral portion of the peripheral wall of the cartridge, said peripheral wall defining with adjacent portions of the wall a pair of spaced slots separating said portion of said wall from adjacent portions of the wall.

5. In cartridge loading motion picture projection apparatus comprising a cartridge having a pair of spaced side walls and a peripheral wall extending between the outer edges of the side walls to define a substantially enclosed chamber for a film roll, means defining an opening in the peripheral wall, a projector film feeding mechanism adapted to enter the cartridge for extracting a leading end of a film roll from the cartridge, the film feeding mechanism including a plurality of pulleys having an endless belt trained therearound, the belt being engageable with a film roll in the cartridge for rotating the roll in an unwinding direction, the improvement comprising:
   means including a deflectable member having a first end portion secured to the peripheral wall of the cartridge and a second end portion that is free to move with respect to an adjacent portion of said peripheral wall for guiding the film from said peripheral wall toward the point at which said belt engages the film roll, and
   at least one boss extending outwardly from the film feeding mechanism and positioned to be engageable with the free end portion of the deflectable member as the stripping mechanism enters the cartridge through its opening for deflecting said member into the chamber in the cartridge so that the deflectable member defines a guide for film from the peripheral wall of the cartridge toward the point at which the stripping mechanism belt engages the film roll periphery, whereby the leading end of a clock-sprung roll may be guided toward said point as the film roll is rotated in an unwinding direction by the stripping mechanism.

6. The improvement as set forth in claim 5 wherein a portion of said free end of said deflectable member is curved to avoid disengagement between the boss of the stripping mechanism and said free end as the mechanism moves toward engagement with the film roll periphery.

7. The improvement as set forth in claim 5 wherein said film feeding mechanism comprises a plurality of shafts mounting said pulleys, and said boss comprises an end portion of one of said shafts.

8. The improvement as set forth in claim 5 wherein said film feeding mechanism further comprises a side plate positioned adjacent said pulleys, and said boss comprises an extension on said plate projecting beyond the periphery of one of said pulleys and one of said plates.

9. The improvement as set forth in claim 5 wherein said film feeding mechanism further comprises a film stripping member engageable with the film roll for deflecting the leading end of film from the roll when the roll is rotated in an unwinding direction by said belt, and said mechanism further comprising means on said film stripping member for urging the film into contact with the belt.

10. A film feeding mechanism for removing a leading end of a web material from a roll of such material, the mechanism comprising:
   drive means engageable with the roll for driving the roll in an unwinding direction;
   a film stripping member engageable with the roll for lifting the leading end of the web from the roll and defining with a portion of said drive means a web path for guiding the web away from the roll when said drive means and said film stripping members are in engagement with the roll; and
   an elongate, resilient portion on said film stripping member engageable with a web in said path for urging the web toward said portion of said drive means to assure film contact with the web by said drive means and said member.

11. A film feeding mechanism as set forth in claim 10 wherein said drive means comprises an endless belt trained around at least two pulleys, and said portion of said drive means comprises a reach of said belt.

12. A film feeding mechanism as set forth in claim 10 wherein said resilient portion comprises a flexible finger-like member having a free-end portion.

* * * * *